(12) United States Patent
Lin

(10) Patent No.: US 12,049,933 B2
(45) Date of Patent: Jul. 30, 2024

(54) ELECTRIC PUSH ROD WITH DUAL BRAKE MECHANISM

(71) Applicant: TIMOTION TECHNOLOGY CO., LTD., New Taipei (TW)

(72) Inventor: Yu-Chang Lin, New Taipei (TW)

(73) Assignee: TIMOTION TECHNOLOGY CO., LTD., New Taipei (TW)

( * ) Notice: Subject to any disclaimer, the term of this patent is extended or adjusted under 35 U.S.C. 154(b) by 831 days.

(21) Appl. No.: 17/182,070

(22) Filed: Feb. 22, 2021

(65) Prior Publication Data

US 2022/0196093 A1 Jun. 23, 2022

(30) Foreign Application Priority Data

Dec. 21, 2020 (TW) ................................. 109216877

(51) Int. Cl.

| F16H 25/24 | (2006.01) |
|---|---|
| B60T 13/74 | (2006.01) |
| F16D 65/18 | (2006.01) |
| F16D 121/14 | (2012.01) |
| F16D 121/24 | (2012.01) |
| F16D 123/00 | (2012.01) |

(52) U.S. Cl.
CPC ............ F16D 65/18 (2013.01); B60T 13/746 (2013.01); F16H 25/2454 (2013.01); *F16D 2121/14* (2013.01); *F16D 2121/24* (2013.01); *F16D 2123/00* (2013.01); *F16H 2025/2463* (2013.01)

(58) Field of Classification Search
CPC ..................... F16H 25/2454; F16H 2025/2463
See application file for complete search history.

(56) References Cited

U.S. PATENT DOCUMENTS

| 3,524,526 A | * | 8/1970 | Denkowski | ............. F16K 31/05 |
| | | | | 318/475 |
| 4,697,672 A | * | 10/1987 | Linton | .................... F16D 67/00 |
| | | | | 188/134 |
| 6,240,797 B1 | * | 6/2001 | Morishima | ......... F16H 25/2454 |
| | | | | 188/134 |
| 6,927,513 B2 | * | 8/2005 | Schreier | .................. F16H 25/20 |
| | | | | 310/90 |
| 8,210,064 B2 | * | 7/2012 | Ku | ............................. B66F 3/08 |
| | | | | 74/89.38 |
| 9,772,013 B2 | * | 9/2017 | Tsai | ........................ F16H 25/20 |
| 10,619,715 B2 | * | 4/2020 | Tsai | ........................ F16H 25/20 |

(Continued)

*Primary Examiner* — Nicholas J Lane
(74) *Attorney, Agent, or Firm* — Chun-Ming Shih; HDLS IPR SERVICES

(57) ABSTRACT

An electric push rod with a dual brake mechanism includes an electric motor, a transmission device, a first brake mechanism and a second brake mechanism. The electric motor has a driving wheel. The transmission device is installed on a side of the electric motor and includes a deceleration mechanism, a lead screw, a driven wheel, and a telescopic pipe. The deceleration mechanism is disposed between the driving wheel and the driven wheel. The lead screw is sheathed with the driven wheel and the driven wheel is driven by the electric motor to rotate together with the lead screw. The telescopic pipe and the lead screw are screwed and driven. The lead screw is sheathed with the first brake mechanism formed on a side edge of the driven wheel. The lead screw is sheathed with the second brake mechanism disposed between the driven wheel and the telescopic pipe.

12 Claims, 11 Drawing Sheets

(56) References Cited

U.S. PATENT DOCUMENTS

| | | | |
|---|---|---|---|
| 11,300,185 B2* | 4/2022 | Gavriliuc | G01B 7/18 |
| 2006/0070827 A1* | 4/2006 | Sandells | B64C 13/28 |
| | | | 188/82.8 |
| 2006/0081079 A1* | 4/2006 | Jaecklin | F16H 25/2454 |
| | | | 74/89.23 |
| 2006/0084544 A1* | 4/2006 | Chou | F16H 1/46 |
| | | | 475/110 |
| 2009/0044646 A1* | 2/2009 | Duck | H02K 7/102 |
| | | | 74/89.39 |
| 2010/0213310 A1* | 8/2010 | Flatt | F16H 1/16 |
| | | | 244/99.2 |
| 2011/0048147 A1* | 3/2011 | Keech | F16H 25/205 |
| | | | 74/89.26 |

* cited by examiner

ELECTRIC PUSH ROD WITH DUAL BRAKE MECHANISM

BACKGROUND OF THE DISCLOSURE

Technical Field

The technical field of this disclosure relates to an electric push rod and more particularly to an electric push rod with a dual brake mechanism.

Description of Related Art

Electric push rods are applied to medical and residential beds, massage chairs, fitness equipment, rehabilitation equipment, door openers, window openers, lifting mechanisms and other devices. A related-art electric push rod uses an electric motor to carry out a transmission by a transmission mechanism, and the transmission mechanism includes a worm screw and worm wheel set, a lead screw, and a telescopic pipe. The worm screw and worm wheel set are provided for driving the lead screw to perform a rotational movement, and the telescopic pipe is driven to perform a linear displacement through the rotational movement of the lead screw.

When the electric motor of the electric push rod drives the lead screw and the telescopic pipe in a manner of a worm screw (or main shaft) engaging with a worm wheel (or a gear set), the transmission power is large. Thus, when the electric push rod stops operating, the lead screw is easily to be caused to rotate in a reverse direction due to the load, and that makes the telescopic pipe descend quickly without braking immediately.

In view of the aforementioned drawback, the discloser of this disclosure based on years of experience in the related industry to conduct extensive research and experiment, and finally provided a feasible solution to overcome the drawback of the related art.

SUMMARY OF THE DISCLOSURE

The objective of this disclosure is to provide an electric push rod with a dual brake mechanism which may ensure the safety of the operation process in applications of heavy loads.

To achieve the aforementioned and other objectives, this disclosure provides an electric push rod with a dual brake mechanism, including: an electric motor, a transmission device, a first brake mechanism and a second brake mechanism. The electric motor has a driving wheel. The transmission device is installed to a side of the electric motor. The transmission mechanism includes a deceleration mechanism, a lead screw, a driven wheel, and a telescopic pipe. The deceleration mechanism is disposed between the driving wheel and the driven wheel to perform a gear meshing transmission. The lead screw is sheathed with the driven wheel and the driven wheel is driven by the electric motor to rotate together with the lead screw. The telescopic pipe is screwed and coupled to the lead screw and driven by the lead screw. The lead screw is sheathed with the first brake mechanism and the first brake mechanism is disposed on a side edge of the driven wheel. The lead screw is sheathed with the second brake mechanism and the second brake mechanism is disposed between the driven wheel and the telescopic pipe. In a thrust application, when the telescopic pipe retracts inwardly, the first brake mechanism produces a braking effect to the driven wheel in a pull application, when the telescopic pipe extends outwardly, the second brake mechanism produces a braking effect to the driven wheel.

This disclosure has the following effects. The socket is clamped between the fixed nut and the driven wheel, and the lead screw may maintain original structural strength without the risk of being broken or cracked due to a decreased cross-sectional area. The configuration of the planetary gear set and the upper and lower bearings provides a stable transmission to the structure and produces less noises. This disclosure may make the electric push rod bear a load with greater pushing or pulling force in the axial direction, and ensure the stability and reliability for the transmission of the entire structure.

DESCRIPTION OF THE EMBODIMENTS

Figure 1:
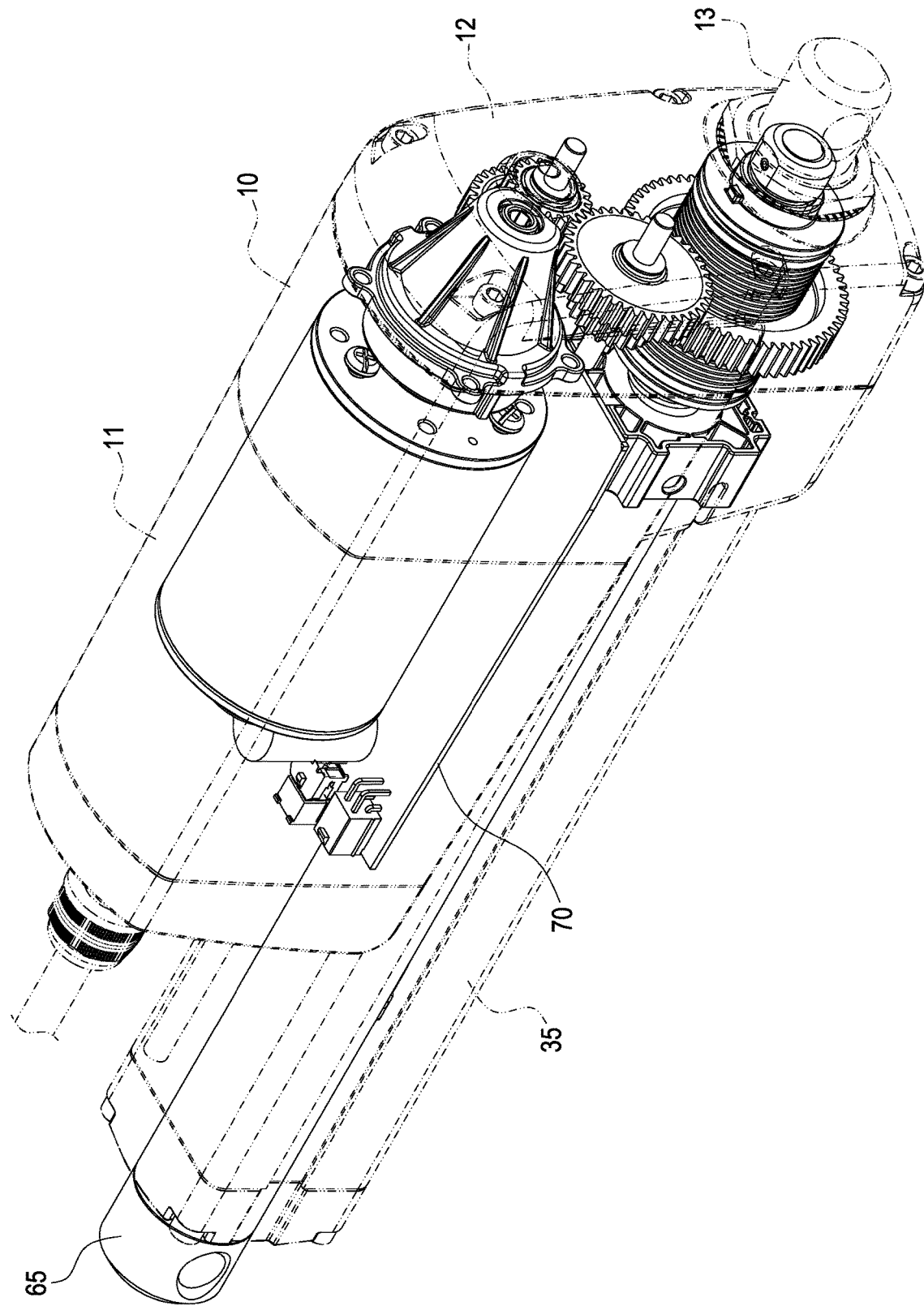
FIG. 1 is a perspective view of this disclosure.

The technical contents of this disclosure are described with the detailed description of embodiments accompanied with the illustration of related drawings as below. It is intended that the embodiments and drawings disclosed herein are to be considered illustrative rather than restrictive.

With reference to FIGS. 1 to 8 for an electric push rod with a dual brake mechanism in accordance with this disclosure, the electric push rod includes a base 10, an electric motor 20, a transmission device 30, a first brake mechanism 40 and a second brake mechanism 50.

As shown in FIG. 1, the base 10 is made of zinc alloy and mainly provided for fixing and installing the electric motor 20 and the transmission device 30. The base 10 has a front casing 11 and a rear casing 12 disposed on the front side and the back side of the base 10 respectively and covering the base 10. Both of the front casing 11 and the rear casing 12 are made of zinc alloy. The front casing 11 covers the exterior of the electric motor 20, and the rear casing 12 covers a part of the transmission device 30, the exterior of the first brake mechanism 40 and the exterior of the second brake mechanism 50. In addition, the rear casing 12 has a rear support 13 passing through and coupled to the casing 12 corresponding to the transmission device 30.

Figure 2:
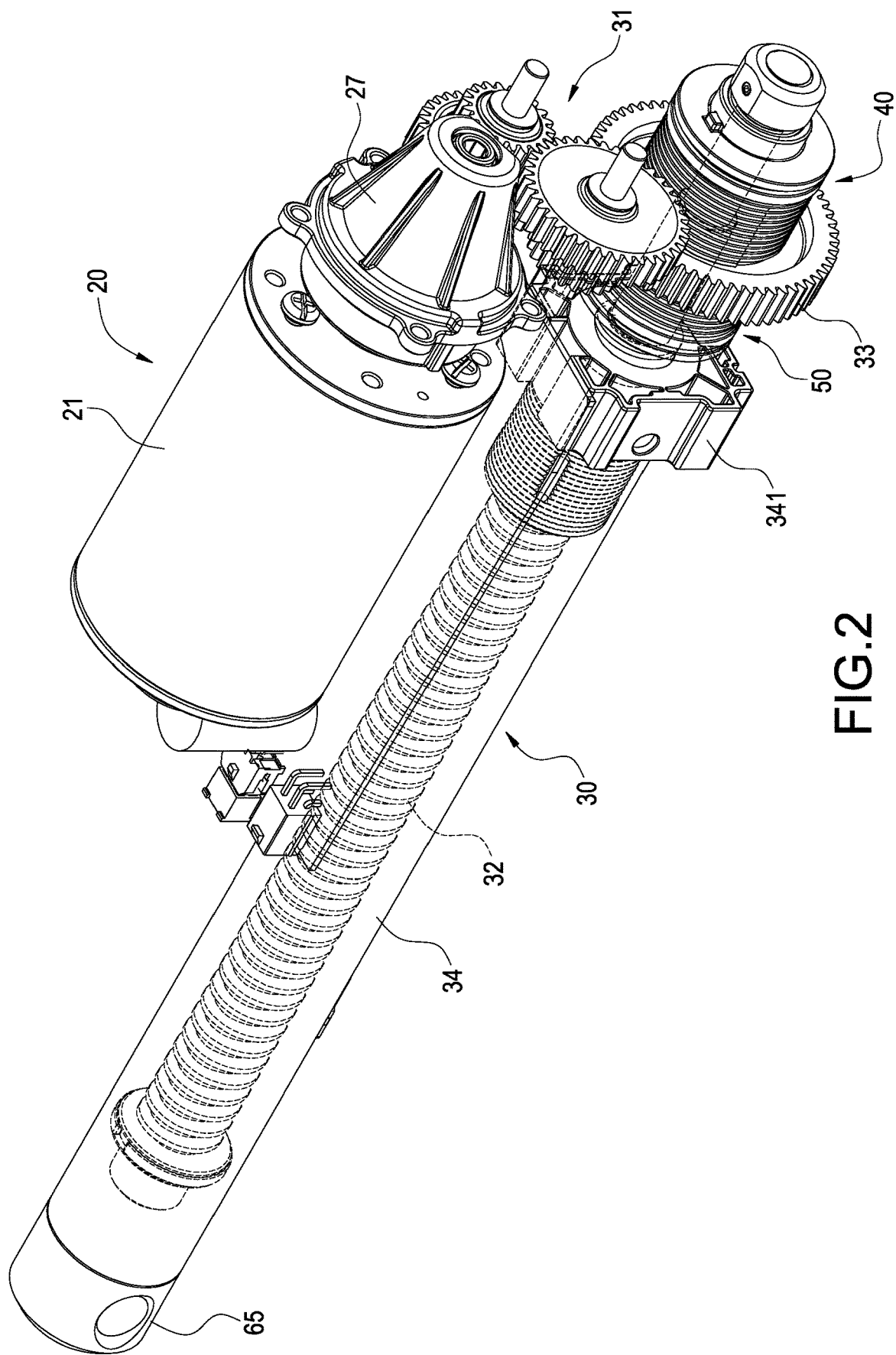
FIG. 2 is a perspective view showing an assemble of an electric motor, a transmission device and each brake mechanism in accordance with this disclosure.
Figure 3:
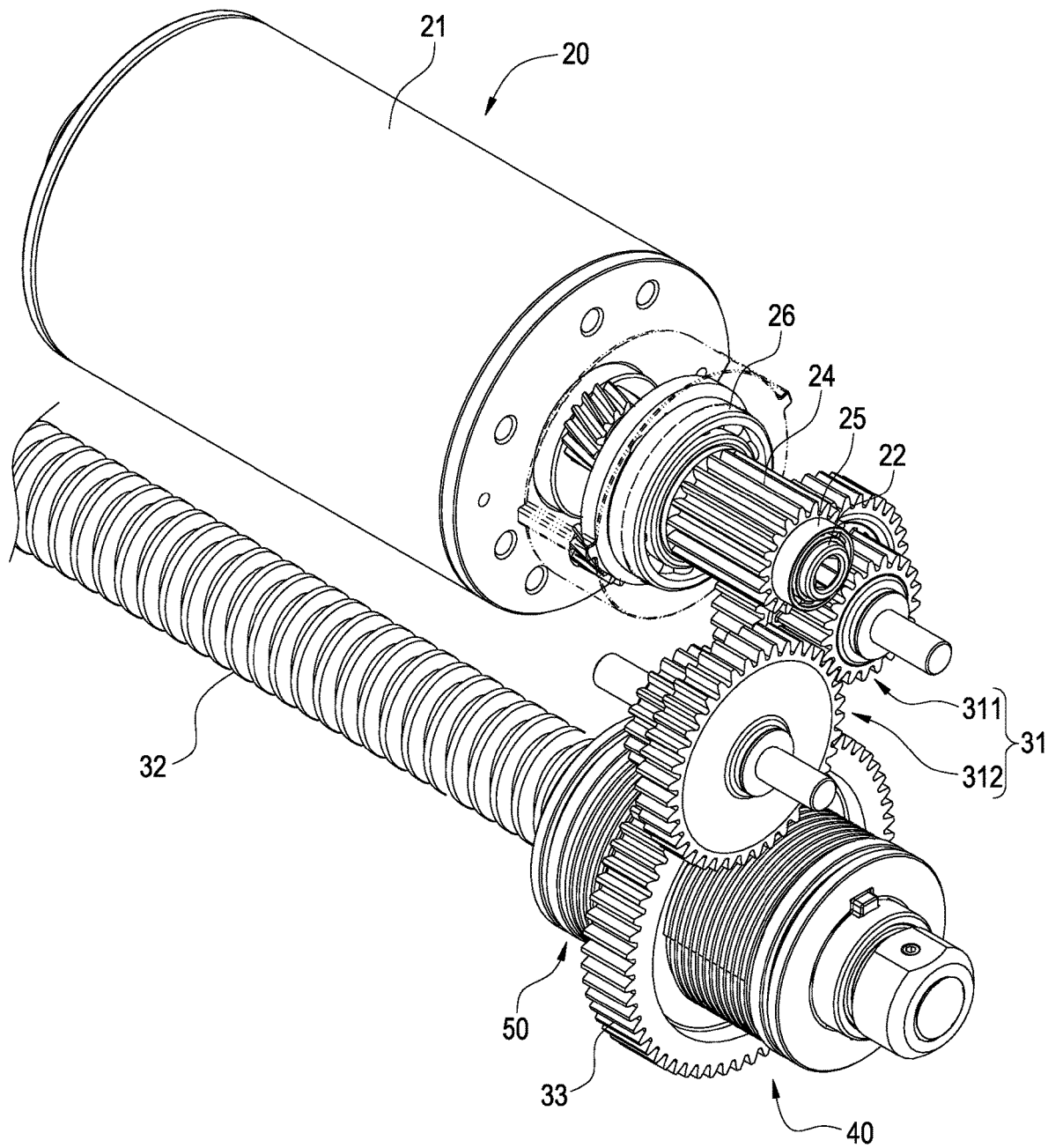
FIG. 3 is a perspective view showing an assemble of a deceleration mechanism, an electric motor and a driven wheel in accordance with this disclosure.
Figure 4:
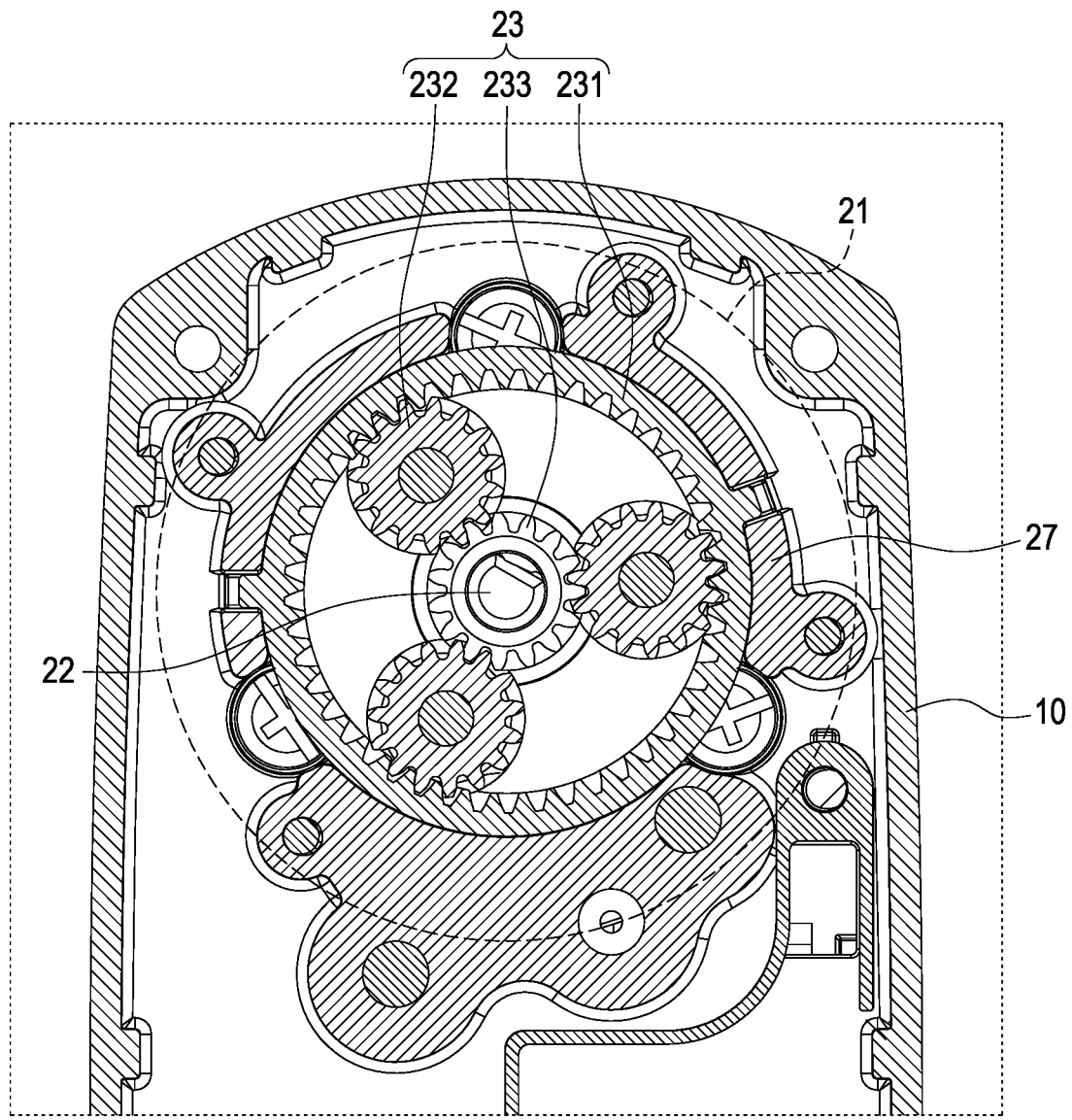
FIG. 4 is a cross-sectional view showing an assemble of an electric motor and a base in accordance with this disclosure.

In FIGS. 2 to 4, the electric motor 20 is fixed to the base 10 and includes a main body 21 and a rotating shaft 22 passing through and coupled to the main body 21. The main body 21 is fixed to the base 10 by a locking element such as a screw. A planetary gear set 23 is installed in an area of the rotating shaft 22 that extends out from the main body 21. The planetary gear set 23 includes a fixed gear 231, three planetary gears 232 and a center gear 233 (as shown in FIG. 4). The fixed gear 231 is not rotated through the bump being inserted and fixed to the base 10. The rotating shaft 22 is sheathed with the center gear 233 and the center gear 233 is rotated together with the rotating shaft 22. Each planetary gear 232 is arranged equidistantly between the fixed gear 231 and the center gear 233, and engages with the fixed gear 231 and the center gear 233 to perform a gear meshing transmission with one another.

In addition, a driving wheel 24 is installed to an outer side of the planetary gear set 23, and an upper bearing 25 is installed on an upper end of the driving wheel 24, and a lower bearing 26 is installed on a lower end of the driving wheel 24. The rotating shaft 22 is sheathed with the driving wheel 24, the upper bearing 25 and the lower bearing 26, so as to provide a stable transmission to the structure and produce less noise. Further, a support seat 27 covers the exterior of the driving wheel 24, the upper bearing 25 and the lower bearing 26. and an outer periphery of the fixed gear 231 of the planetary gear set 23 is sheathed with the bottom of the support seat 27 (as shown in FIGS. 2 and 4), and the support seat 27 is fixed to the base 10 by a locking element.

The transmission device 30 is installed on a side of the electric motor 20 and includes a deceleration mechanism 31, a lead screw 32, a driven wheel 33, a telescopic pipe 34 and an outer pipe 35. The deceleration mechanism 31 is disposed between the driving wheel 24 and the driven wheel 33. The deceleration mechanism 31 of this embodiment includes a first transmission gear set 311 and a second transmission gear set 312, and the first transmission gear set 311 engages with the driving wheel 24 and the second transmission gear set 312 to perform a gear meshing transmission with one another. The second transmission gear set 312 drives the driven wheel 33 to rotate.

Figure 5:
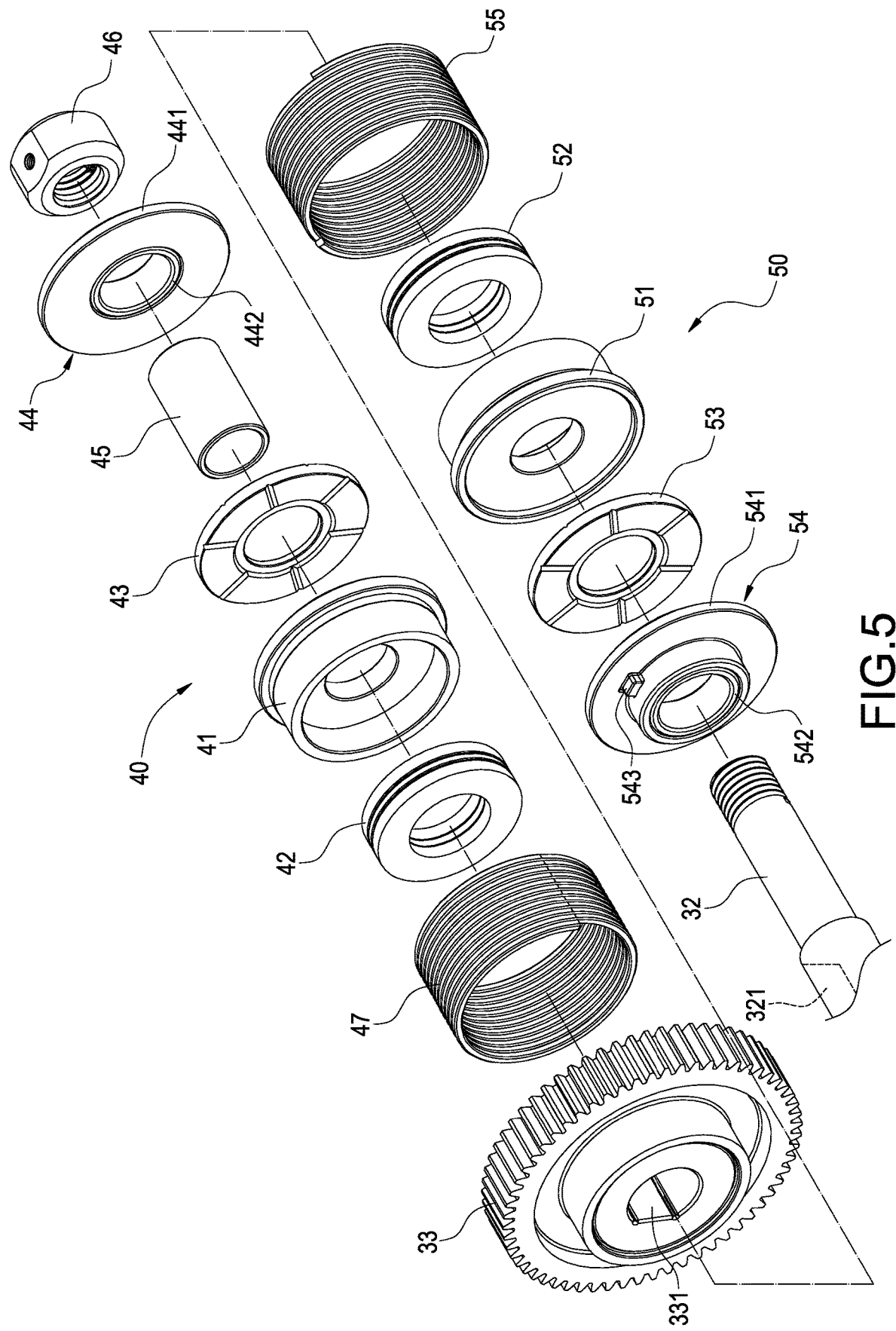
FIG. 5 is an exploded view showing each brake mechanism, a driven wheel and a lead screw in accordance with this disclosure.

The lead screw 32 is configured to be parallel to the rotating shaft 22 and formed under the rotating shaft 22. The lead screw 32 is sheathed with the driven wheel 33 and the driven wheel 33 is driven by the driving wheel 24 of the electric motor 20 to drive the deceleration mechanism 31, and the deceleration mechanism 31 drives the driven wheel 33 and the lead screw 32 to rotate altogether. The positioning planes 331, 321 (as shown in FIG. 5) are disposed on the connecting position of the driven wheel 33 and the lead screw 32 respectively and matched with each other, so that the driven wheel 33 and the lead screw 32 may rotate together.

The telescopic pipe 34 has a nut 341 coupled to an end thereof (as shown in FIG. 2), and the telescopic pipe 34 is screwed and coupled to the lead screw 32 through the nut 341. The telescopic pipe 34 is sheathed with the outer pipe 35, and an end of the outer pipe 35 is fixed to the base 10, and the outer pipe 35 has a structure (not shown in the figure) matching with the shape of the nut 341 in the interior thereof to restrict the rotation of the nut 341. The lead screw 32 rotates to drive the telescopic pipe 34 to perform a linear extending or retracting movement relative to the lead screw 32 and the outer pipe 35.

Figure 6:
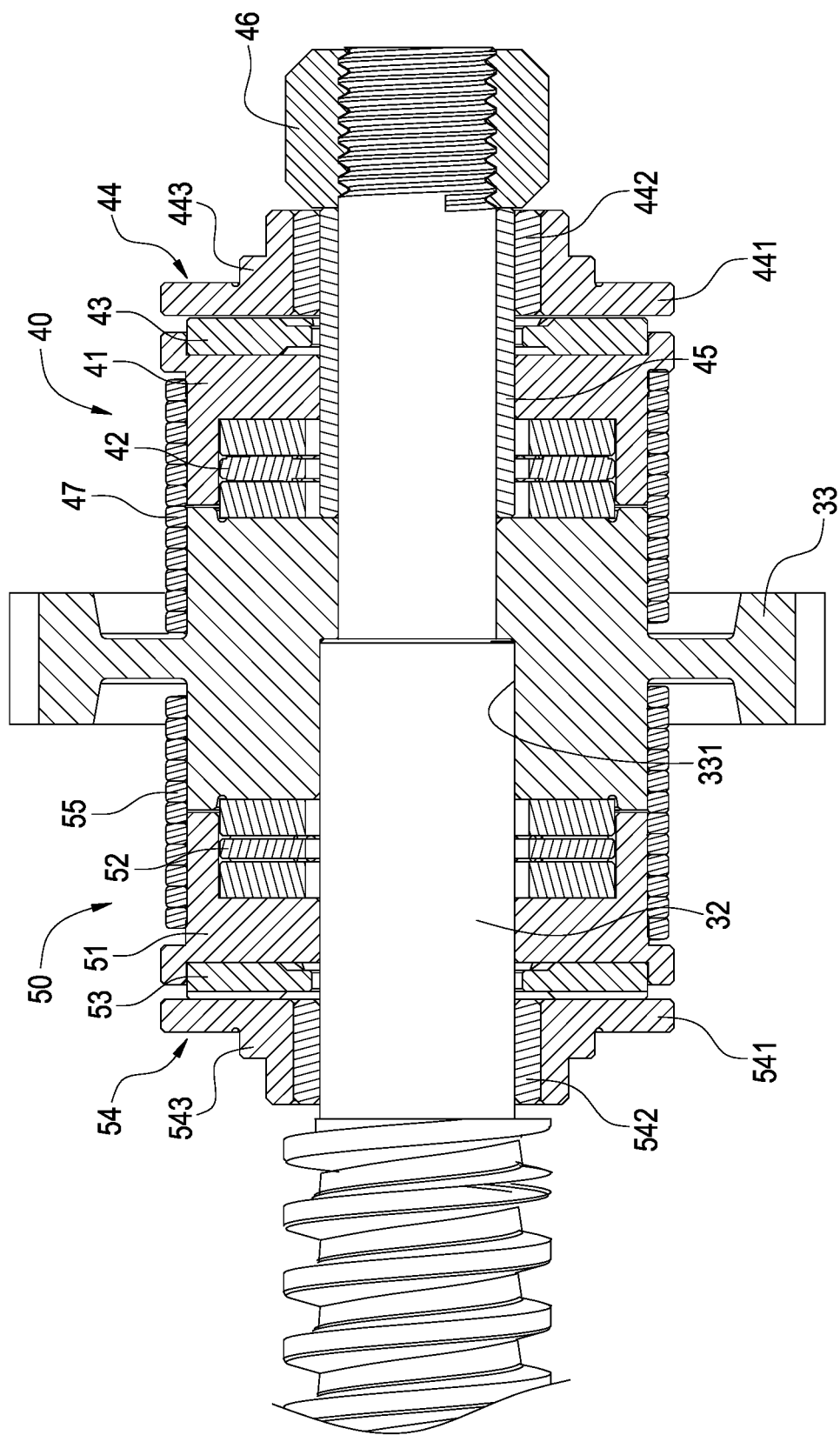
FIG. 6 is a cross-sectional view showing each brake mechanism, a driven wheel and a lead screw in accordance with this disclosure.

In FIGS. 5 to 8, the lead screw 32 is sheathed with the first brake mechanism 40 and the first brake mechanism 40 is formed on a side edge of the driven wheel 33. The first brake mechanism 40 includes a first brake ring 41, a first thrust bearing 42, a first brake pad 43, a first fixed part 44, a socket 45, a fixed nut 46 and a first coil spring 47. The first thrust bearing 42 is sheathed with the first brake ring 41. The first brake ring 41 is sequentially stacked with the first brake pad 43 and the first fixed part 44 and the lead screw 32 is sheathed therewith. The socket 45 passes through and is coupled to the interior of the first fixed part 44, the first brake pad 43, the first brake ring 41 and the first thrust bearing 42, and the socket 45 is confined between an end surface of the driven wheel 33 and the fixed nut 46 (as shown in FIG. 6). A part of the area of the driven wheel 33 and an outer periphery of the first brake ring 41 are sheathed with the first coil spring 47.

Figure 7:
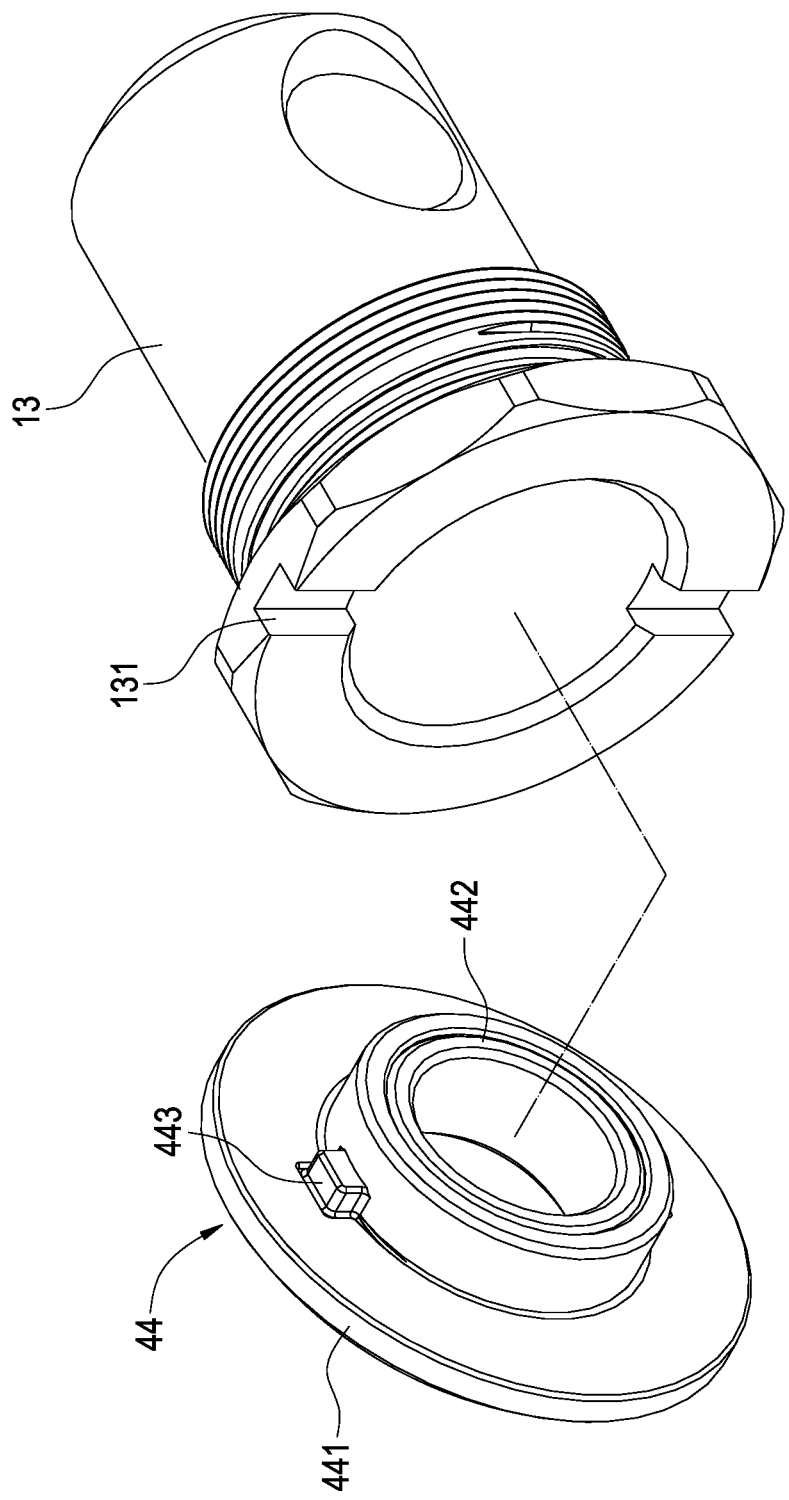
FIG. 7 is an exploded view showing a first fixing member and a rear support in accordance with this disclosure.

Further, the first fixed part 44 includes a disk 441 and a bearing 442. The disk 441 has a center hole for installing the bearing 442, and two bumps 443 are extended from the back of the disk 441. In addition, the rear support 13 has an insert slot 131 for each bump 443 to be inserted and fixed (as shown in FIG. 7).

The lead screw 32 is sheathed with the second brake mechanism 50 and the second brake mechanism 50 is disposed between the driven wheel 33 and the telescopic pipe 33. The second brake mechanism 50 includes a second brake ring 51, a second thrust bearing 52, a second brake pad 53, a second fixed part 54 and a second coil spring 55. The second thrust bearing 52 is sheathed with the second brake ring 51. The second brake ring 51 is sequentially stacked with the second brake pad 53 and the second fixed part 54 and the lead screw 32 is sheathed therewith. The other part of the area of the driven wheel 33 and an outer periphery of the second brake ring 51 are sheathed with the second coil spring 55.

Figure 8:
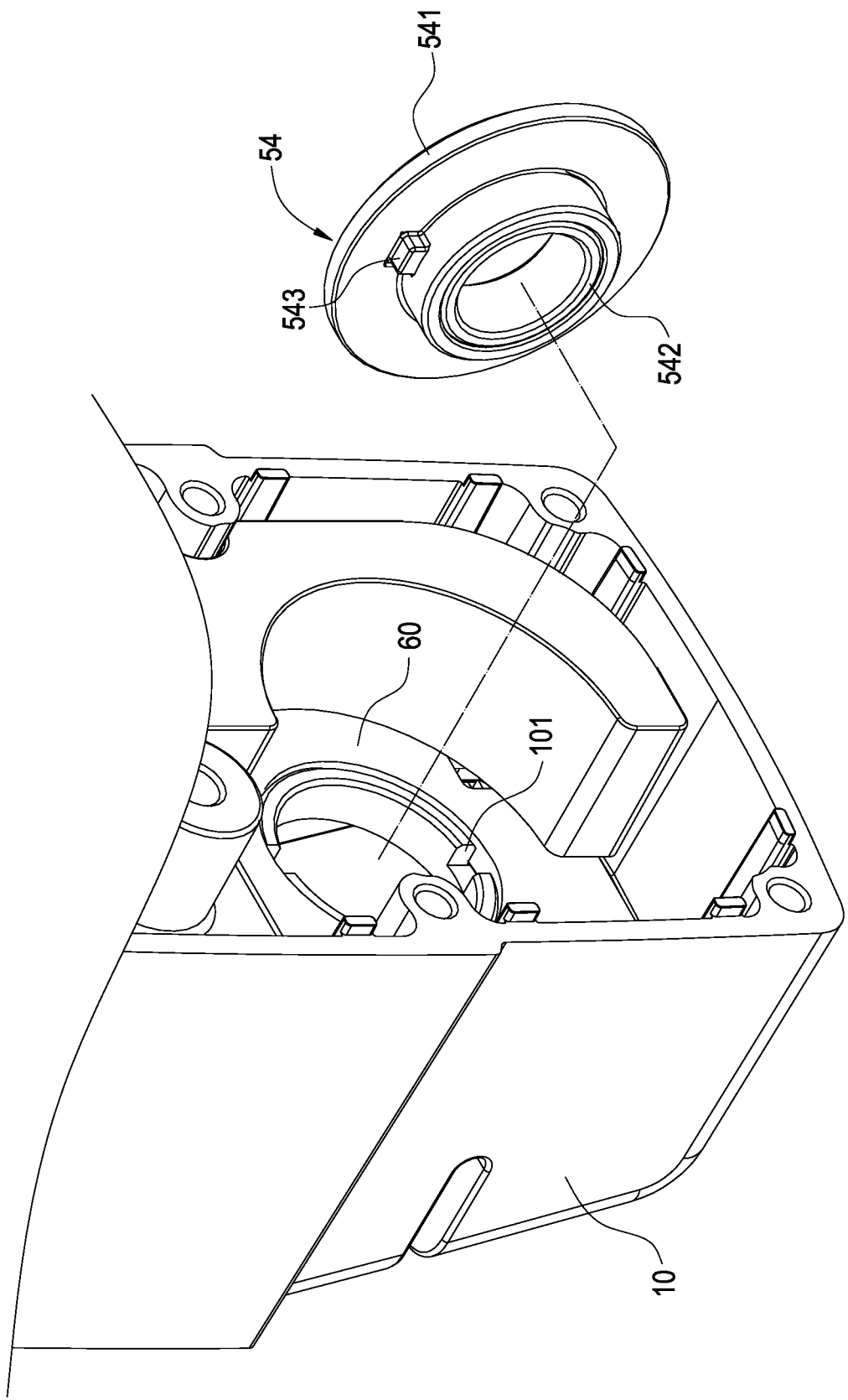
FIG. 8 is an exploded view showing a second fixing member and a base in accordance with this disclosure.

Further, the second fixed part 54 includes a disk 541 and a bearing 542. The disk 541 has a center hole for installing the bearing 542. In addition, two bumps 543 are extended from the back of the disk 541. The base 10 has an insert slot 101 for each bump 543 to be inserted and fixed (as shown in FIG. 8).

Figure 9:
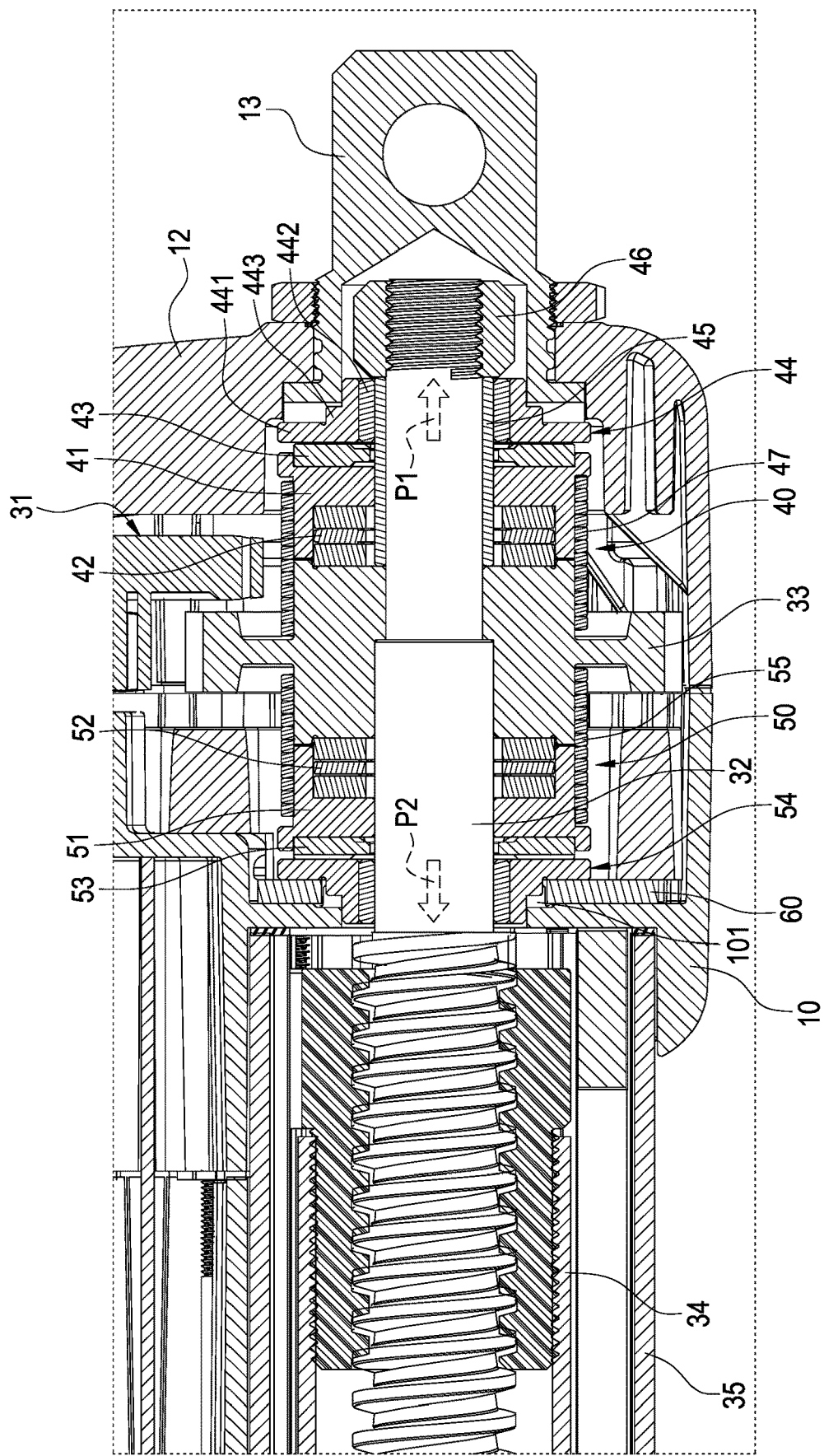
FIG. 9 is a cross-sectional view of an electric push rod of this disclosure.

Further, the electric push rod with the dual brake mechanism in accordance with this disclosure further includes a carrying board 60 (as shown in FIG. 9), a front support 65 and a drive control module 70 (as shown in FIG. 1). The carrying board 60 is made of medium carbon steel, and is fixed onto the base 10 through a locking element such as a screw. The front support 65 is coupled to an end of the telescopic pipe 34 away from the nut 341. The drive control module 70 is installed between the outer pipe 35 and the electric motor 20 and comprehensively covered by the front casing 11. The drive control module 70 has the functions of real-time monitoring, slow start and stop of the extension and retraction, overcurrent disconnection, and adjustable stroke, so as to achieve an intelligent design.

Figure 10:
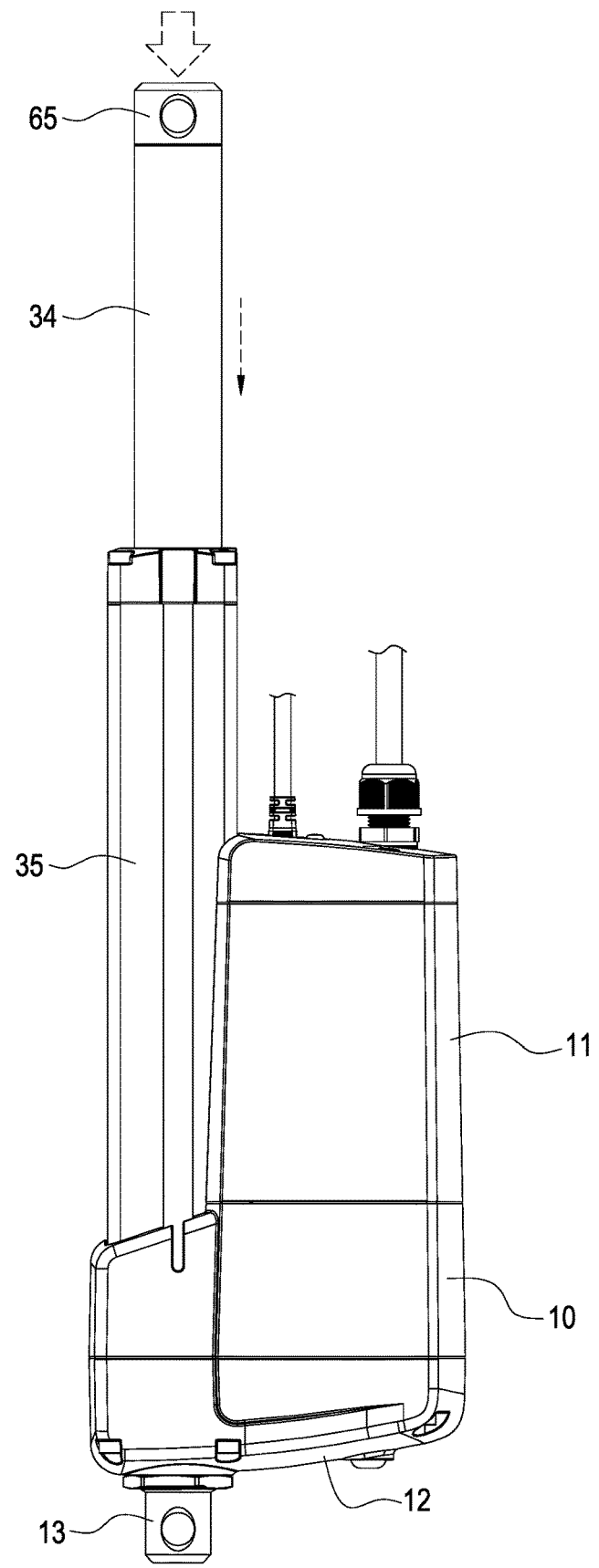
FIG. 10 is a schematic view showing a using status of this disclosure in a thrust application.

In FIGS. 9 and 10, when being affected by a heavy load in a thrust application, the telescopic pipe 34 starts in a status of retracting all the way to the bottom, and all of the first brake mechanism 40, the second brake mechanism 50, the lead screw 32 and the driven wheel 33 move toward a direction P1, and when the telescopic pipe 34 extends outwardly, the telescopic pipe 34 may move in uniform speed, and the power supplied by the electric motor 20 and the load pressure are in equilibrium. The first brake ring 41, the second brake ring 51, the first brake pad 43, the second brake pad 53, the first fixed part 44 and the second fixed part 54 are in a loosened status. Brake is not available in this status.

When the telescopic pipe 34 retracts towards the interior of the outer pipe 35, the first coil spring 47 is under the pressure of the load, so that the lead screw 32 presses the driven wheel 33, and the driven wheel 33 presses the first thrust bearing 42, and the first thrust bearing 42 presses the first brake ring 41, and the first brake ring 41 presses the first brake pad 43, and the first brake pad 43 presses the first fixed part 44, and the first fixed part 44 presses the rear support 13. Since the rear support 13 is locked to the rear casing 12, the first fixed part 44 and the rear support 13 are positioned by the embedment of each bump 443 and each insert slot 131 (as shown in FIG. 7). The first brake mechanism 40 is in a pressurized status, so that the rotation of the driven wheel 33 drives the first coil spring 47 to rotate, and the first coil spring 47 drives the first brake ring 41 to rotate. The first coil spring 47 is in a status of holding the first brake ring 41 and the driven wheel 33. Under the condition of the first fixed part 44 remaining still, a resistance is generated due to the friction among the first brake pad 43, the first fixed part 44 and the first brake ring 41 to achieve the braking effect.

Figure 11:
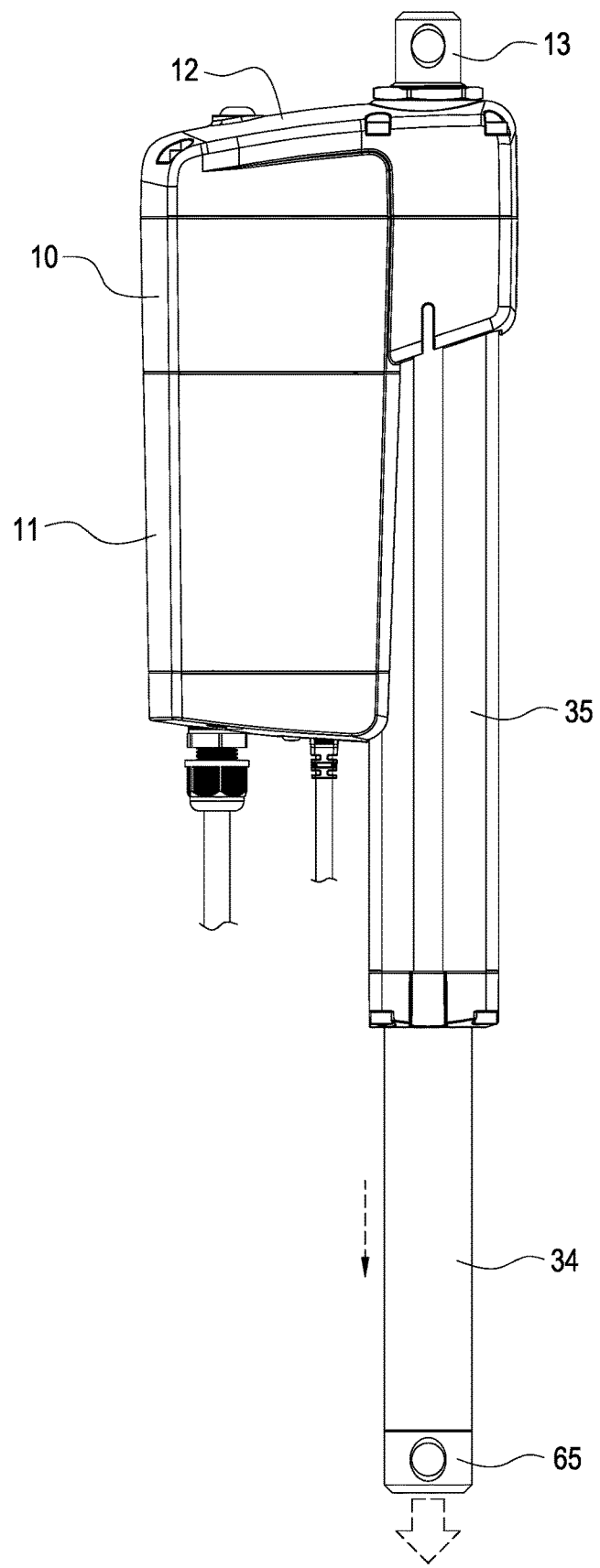
FIG. 11 is a schematic view showing a using status of this disclosure in a pull application.

In FIGS. 9 and 11, when being affected by a pulling force of a load in a pull application, the telescopic pipe 34 starts in a status of extending to the top, and all of the first brake mechanism 40, the second brake mechanism 50, the lead screw 32 and the driven wheel 33 move toward a direction P2, and when the telescopic pipe 34 retracts inwardly, the telescopic pipe 34 may move in a uniform speed, and the power supplied by the electric motor 20 and the pulling force of the load is in equilibrium. All of the first brake ring 41, the second brake ring 51, the first brake pad 43, the second brake pad 53, the first fixed part 44 and the second fixed part 54 are in a loosened status. Brake is not available in this status.

When the telescopic pipe 34 extends towards the exterior of the outer pipe 35, the second coil spring 55 is under the effect of the pulling force of the load, so that the fixed nut 46 presses the socket 45, and the socket 45 presses the driven wheel 33, and the driven wheel 33 presses the second thrust bearing 52, and the second thrust bearing 52 presses the second brake ring 51, and the second brake ring 51 presses the second brake pad 53, and the second brake pad 53 presses the second fixed part 54, and the second fixed part 54 presses the carrying board 60. Since the carrying board 60 is locked to the base 10 by a screw, the second fixed part 54 and the base 10 are positioned by the embedment of each bump 543 and each insert slot 101 (as shown in FIG. 8). The second brake mechanism 50 is in a pulled status, so that the rotation of driven wheel 33 drives the second coil spring 55 to rotate, and the second coil spring 55 drives the second brake ring 51 to rotate. The second coil spring 55 is in a status of holding the second brake ring 51 and the driven wheel 33. Under the condition of the second fixed part 54 remaining still, a resistance is generated due to the friction among the second brake pad 53, the second fixed part 54 and the second brake ring 51 to achieve the braking effect.

In summary of the description above, the electric push rod with the dual brake mechanism in accordance with this disclosure may achieve the expected effects, overcomes the drawbacks of the related art. While this disclosure has been described by means of specific embodiments, numerous modifications and variations could be made thereto by those skilled in the art without departing from the scope and spirit of this disclosure set forth in the claims.

What is claimed is:

1. An electric push rod with a dual brake mechanism, the electric push rod comprising:
   an electric motor, comprising a driving wheel;
   a transmission device, installed on a side of the electric motor and comprising a deceleration mechanism, a lead screw, a driven wheel and a telescopic pipe, the deceleration mechanism installed between the driving wheel and the driven wheel to perform a gear meshing transmission with one another, the lead screw being sheathed with the driven wheel and the driven wheel driven by the electric motor to rotate together with the lead screw, and the telescopic pipe screwed and coupled to the lead screw and driven by the lead screw;
   a first brake mechanism, adapted to sheath the lead screw and the first brake mechanism disposed on a side edge of the driven wheel; and
   a second brake mechanism, adapted to sheath the lead screw and the second brake mechanism disposed between the driven wheel and the telescopic pipe;
   wherein, in a thrust application, when the telescopic pipe retracts inwardly, the first brake mechanism produces a braking effect to the driven wheel; in a pull application, when the telescopic pipe extends outwardly, the second brake mechanism produces a braking effect to the driven wheel;
   wherein the first brake mechanism comprises a socket and a fixed nut, and the socket sheaths the lead screw and is confined between an end surface of the driven wheel and the fixed nut.

2. The electric push rod with the dual brake mechanism in claim 1, wherein the first brake mechanism further comprises a first brake ring, a first thrust bearing, a first brake pad, a first fixed part, and a first coil spring, and the first thrust bearing is sheathed with the first brake ring and the first brake ring is sequentially stacked with the first brake pad and the first fixed part, and the lead screw is sheathed therewith, and the socket passes through and is coupled inside the first fixed part, the first brake pad, the first brake ring and the first thrust bearing, and a part of the driven wheel and an outer periphery of the first brake ring are sheathed with the first coil spring.

3. The electric push rod with the dual brake mechanism in claim 2, further comprising: a rear support, and the first fixed part comprising a disk and a bearing installed in the disk, a plurality of bumps extending from the disk, and the rear support comprising an insert slot, each bump inserted and fixed in the insert slot.

4. The electric push rod with the dual brake mechanism in claim 2, wherein the second brake mechanism comprises a second brake ring, a second thrust bearing, a second brake pad, a second fixed part and a second coil spring, and the second thrust bearing is sheathed with the second brake ring and the second brake ring is sequentially stacked with the second brake pad and the second fixed part, and the lead screw is sheathed therewith, and the other part of the area of driven wheel and an outer periphery of the second brake ring are sheathed with the second coil spring.

5. The electric push rod with the dual brake mechanism in claim 4, further comprising: a base, and the second fixed part comprising a disk, a bearing installed in the disk and a plurality of bumps extending from the disk, and the base comprising an insert slot, each bump inserted and fixed in the insert slot.

6. The electric push rod with the dual brake mechanism in claim 1, wherein the electric motor comprises a main body and a rotating shaft passing through and coupled to the main body, and a planetary gear set is installed on an area of the rotating shaft extended out from the main body.

7. The electric push rod with the dual brake mechanism in claim 6, further comprising: a base, and the planetary gear set comprising a fixed gear, a plurality of planetary gears and a center gear, and the fixed gear unrotatedly fixed to the base, and the rotating shaft sheathed with the center gear and the center gear rotating together with the rotating shaft, and each of the planetary gears installed spacedly between the fixed gear and the center gear to perform the gear meshing transmission with one another.

8. The electric push rod with the dual brake mechanism in claim 1, wherein the electric motor comprises a main body and a rotating shaft passing through and coupled to the main body, and the rotating shaft is sheathed with the driving wheel and the driving wheel rotates together with the rotating shaft, and an upper bearing and a lower bearing are installed to top and bottom of the driving wheel respectively.

9. The electric push rod with the dual brake mechanism in claim 1, wherein the deceleration mechanism comprises a first transmission gear set and a second transmission gear set, and the first transmission gear set performs the gear meshing transmission with the driving wheel and the second transmission gear set respectively, and the second transmission gear set engages with the driven wheel to drive the driven wheel to rotate.

10. The electric push rod with the dual brake mechanism in claim 1, further comprising: a base and a carrying board, and the carrying board fixed to the base and arranged correspondingly to the second brake mechanism.

11. The electric push rod with the dual brake mechanism in claim 2, wherein the second brake mechanism comprises a second brake ring, a second thrust bearing, a second brake pad, a second fixed part and a second coil spring, and the second thrust bearing is sheathed with the second brake ring and the second brake ring is sequentially stacked with the second brake pad and the second fixed part, and the lead screw is sheathed therewith, and the other part of the area of driven wheel and an outer periphery of the second brake ring are sheathed with the second coil spring.

12. The electric push rod with the dual brake mechanism in claim 11, further comprising: a base, and the second fixed part comprising a disk, a bearing installed in the disk and a plurality of bumps extending from the disk, and the base comprising an insert slot, each bump inserted and fixed in the insert slot.

* * * * *